(12) United States Patent
Bock et al.

(10) Patent No.: US 8,919,695 B2
(45) Date of Patent: Dec. 30, 2014

(54) STORAGE COMPARTMENT CONFIGURATION

(75) Inventors: Thomas Bock, Grenade (FR); Martin Dehn, Wentorf (DE); Ian Scoley, Hamburg (DE); Ralph Sturm, Schenefeld (DE)

(73) Assignees: Airbus Operations GmbH (DE); Airbus S.A.S. (FR)

(*) Notice: Subject to any disclaimer, the term of this patent is extended or adjusted under 35 U.S.C. 154(b) by 173 days.

(21) Appl. No.: 12/747,237

(22) PCT Filed: Dec. 11, 2008

(86) PCT No.: PCT/EP2008/067283
§ 371 (c)(1),
(2), (4) Date: Jul. 27, 2010

(87) PCT Pub. No.: WO2009/074631
PCT Pub. Date: Jun. 18, 2009

(65) Prior Publication Data
US 2010/0288879 A1    Nov. 18, 2010

Related U.S. Application Data

(60) Provisional application No. 61/007,302, filed on Dec. 12, 2007.

(30) Foreign Application Priority Data
Dec. 12, 2007 (DE) .......................... 10 2007 059 686

(51) Int. Cl.
*B64D 13/00* (2006.01)
*B64D 11/00* (2006.01)

(52) U.S. Cl.
CPC .................................... *B64D 11/003* (2013.01)
USPC ....................................................... 244/118.5

(58) Field of Classification Search
USPC ............. 244/118.5, 118.1; 312/247, 370, 268
See application file for complete search history.

(56) References Cited

U.S. PATENT DOCUMENTS

| | | | |
|---|---|---|---|
| 4,275,942 A | | 6/1981 | Steidl |
| 5,567,028 A | * | 10/1996 | Lutovsky et al. ............. 312/246 |
| 7,246,771 B2 | * | 7/2007 | Wisch et al. ................ 244/118.5 |
| 7,258,406 B2 | * | 8/2007 | Stephan et al. ............... 312/246 |
| 7,762,737 B2 | * | 7/2010 | Schmitz et al. ............... 403/163 |
| 7,823,830 B2 | * | 11/2010 | Feldkirchner et al. ..... 244/118.1 |
| 2002/0101090 A1 | | 8/2002 | Steingrebe et al. |

(Continued)

FOREIGN PATENT DOCUMENTS

| DE | 4425869 A1 | 2/1996 |
|---|---|---|
| DE | 20120481 U | 5/2003 |

(Continued)

*Primary Examiner* — Tien Dinh
*Assistant Examiner* — Keith L Dixon
(74) *Attorney, Agent, or Firm* — Lerner, David, Littenberg, Krumholz & Mentlik, LLP (57) ABSTRACT

A storage compartment configuration and an aircraft having a storage compartment configuration according to the invention are proposed. The storage compartment configuration has a storage compartment having a storage space and a suspension. The storage space is designed to receive pieces of luggage. The suspension is used for the attaching the storage compartment to a load-bearing structure of the aircraft. The suspension is designed in such a manner that the storage compartment can be pivoted essentially around a geometrical center point of the storage space.

13 Claims, 4 Drawing Sheets

(56) References Cited

U.S. PATENT DOCUMENTS

| | | | |
|---|---|---|---|
| 2006/0214055 A1* | 9/2006 | Novak et al. | 244/118.5 |
| 2006/0237585 A1 | 10/2006 | Lau et al. | |
| 2007/0095980 A1 | 5/2007 | Bock | |
| 2007/0095981 A1 | 5/2007 | Bock | |
| 2009/0121080 A1* | 5/2009 | Feldkirchner et al. | 244/118.5 |
| 2009/0250553 A1* | 10/2009 | Bock | 244/118.5 |

FOREIGN PATENT DOCUMENTS

| | | |
|---|---|---|
| FR | 2903963 A1 | 1/2008 |
| WO | 9518040 A1 | 7/1995 |
| WO | 2006087183 A1 | 8/2006 |
| WO | 2008012427 A1 | 1/2008 |

* cited by examiner

STORAGE COMPARTMENT CONFIGURATION

CROSS-REFERENCE TO RELATED APPLICATIONS

This application is a national phase entry under 35 U.S.C. §371 of International Application No. PCT/EP2008/067283, filed Dec. 11, 2008, published in German, which claims the benefit of the filing date of U.S. provisional patent application No. 61/007,302, filed Dec. 12, 2007, and German patent application No. 10 2007 059 686.5, filed Dec. 12, 2007, the disclosures of which applications are hereby incorporated herein by reference.

FIELD OF THE INVENTION

The present invention relates to a storage compartment configuration, in particular a storage compartment configuration for an aircraft, and an aircraft having a storage compartment configuration according to the invention.

BACKGROUND OF THE INVENTION

In the case of passenger transport in vehicles and in particular in aircraft, the luggage of the passengers must be securely stowed and stored during travel. A part of the lighter pieces of luggage, also designated as hand luggage, can be taken along in the cabin of the aircraft during air travel. Receptacles are typically provided for the hand luggage in the cabin. Currently, the typical receptacles are attached above the passenger seats, connected entirely fixed to the structure of the aircraft and to the paneling of the cabin, and equipped with a flap. Alternatively, the receptacles are designed as chutes and are connected at their lowest point to the structure of the aircraft so they are rotatable.

In order to place the luggage in the receptacle, a passenger must heave the piece of luggage to the required height, which can require an enormous expenditure of force depending on the weight of the piece of luggage. In the case of the receptacle designed as a chute, the passenger must apply a large amount of force to close the chute after placing the luggage in the receptacle, in order to move the weight of the piece of luggage and the weight of the chute upward.

It can therefore be seen as an object of the present invention to provide an improved storage compartment configuration, in which in particular the above-described problems of the prior art are at least partially overcome.

SUMMARY OF THE INVENTION

This object can be achieved by the subject matter of the present invention according to the independent claims. Advantageous embodiments of the present invention are described in the dependent claims.

According to a first aspect of the present invention, a storage compartment configuration for an aircraft is described. The storage compartment configuration has a storage compartment having a storage space for receiving pieces of luggage and a suspension for attaching the storage compartment to a load-bearing structure of the aircraft. The suspension is designed in such a manner that the storage compartment can essentially be pivoted around a geometric center point of the storage space.

In other words, one idea of the present invention according to the first aspect is based on the pivotably or rotatably mounted suspension of the storage compartment of the storage compartment configuration on load-bearing structures of the aircraft so that the geometric center point of the storage space and preferably also the center of gravity of the homogeneously loaded storage compartment is in the area of a pivot or rotational axis of the suspension. A pivot or rotation capability of the storage compartment can thus be achieved around a point or an axis without great expenditure of force. In addition, the loading edge height can be lowered by the pivoting of the storage compartment, so that a passenger does not have to heave his piece of luggage as high when the storage compartment is open. If the piece of luggage has been laid in the storage compartment by the passenger, it can be closed with little expenditure of force thanks to the above-mentioned suspension.

Possible features, details, and advantages of a storage compartment configuration according to the first aspect of the invention are discussed in greater detail hereafter. The storage compartment configuration has one storage compartment or multiple storage compartments, which are also referred to as bins. The storage space can be a space which the storage compartment surrounds or encloses with the surrounding structures of the aircraft. Pieces of luggage of the hand luggage may be stored in the storage space. A storage compartment can completely or partially surround the storage space and can optionally be provided with a flap. Possible examples of the shaping of a storage compartment which completely encloses the storage space may be a cuboid or an ellipsoid, possibly having a flap.

The suspension can be a flexible, i.e., pivotable or rotatable connection between the storage compartment and load-bearing structures of the aircraft. The suspension can be fastened on one or preferably multiple points of the storage compartment and further may be designed so that the storage compartment can be pivoted or rotated around one point or around one or more axes. The suspension is designed in such a manner that the storage compartment can be pivoted essentially around a geometric center point of the storage space. "Essentially" can mean a radial deviation from the geometric center point by up to 20 cm, preferably by up to 10 cm, and still more preferably by up to 5 cm.

For example, the geometric center point, in the case of a symmetrical design of the storage space or the storage compartment, can be the center point, which is given by the intersection of the diagonals in the case of a cuboid or parallelogram and is given by the intersection of the axes in the case of an ellipse. The geometric center point of the storage space can be coincident with the center of gravity of the empty and preferably the homogeneously loaded storage compartment and/or can lie on a rotational axis through the suspension.

For example, the term "rotate" can mean a rotational movement of the storage compartment here. The rotational movement can occur around a point or an axis. The term "pivot" can mean a rotational and simultaneously a translational movement here, for example. The translational movement can follow an arbitrary curve. For example, the storage compartment can be rotated around an axis running through the geometric center point of the storage space and this virtual axis can be moved on a curved path.

According to one embodiment of the present invention, the suspension is designed as a first rotational axis.

The design of the suspension as a rotational axis can be implemented, for example, in that the storage compartment is connected at two opposing points to the load-bearing structure of the aircraft so it is rotatable. The storage compartment can thus be rotated around a rotational axis. The loading procedure of the storage compartment can thus be made significantly easier for a passenger, because a lower loading edge height can be achieved by the rotation of the storage compartment than in the case of typical luggage compartments and the passenger must lift his piece of luggage to a lesser height.

According to a further embodiment of the present invention, the suspension is designed in such a manner that a point around which the storage compartment moves while pivoting is essentially coincident with a center of gravity of the homogeneously loaded storage space.

The homogeneous loading of the storage compartment can be a uniform distribution of the pieces of luggage in the storage space. In other words, the homogeneously loaded storage compartment may have the same density, i.e., weight per volume, at every location.

In the meaning of classical mechanics, the center of gravity can be the point at which a body is in equilibrium when it is supported and/or fastened at this point. In other words, this means that the storage compartment, whose suspension is designed in such a manner that the storage compartment is essentially coincident with the center of gravity of the homogeneously loaded storage space, is in equilibrium and only a very slight application of force can be necessary in order to move the storage compartment from one position into another. This can represent a significant advantage for the passengers of an aircraft, who only require little force to close or open a heavily loaded storage compartment through a rotational or pivot movement thanks to the design of the suspension of the storage compartment. It can thus also be made possible for smaller and weaker passengers to operate a storage compartment independently and without external aid. In this design, the storage compartment configuration is also referred to as a center of gravity bin.

According to a further embodiment of the present invention, the storage compartment configuration also has directional elements. The directional elements are designed to encourage a shift of a center of gravity of the homogeneously loaded storage space into the geometric center point.

Directional elements may be mechanical and/or electrical aids, such as springs. An example of a directional element could be a spring having a predetermined spring hardness, which is fastened on the storage compartment. The spring may be stretched in the open state of the storage compartment and oppose the opening so that the heavily loaded storage compartment can be partially displaced into the closed position by the force of the spring. An alternative example of a directional element may be a device which, on the one hand, can determine the weight distribution in the storage space by a balance configuration, for example, and, on the other hand, can encourage the shift of the center of gravity of the loaded storage compartment into the geometric center point by the mechanical shifting of walls of the storage compartment or displacement and tilting of the piece of luggage. For example, deviations may be corrected by directional elements of this type if the storage space is not homogeneously loaded, but rather is only partially filled, for example.

According to a further embodiment of the present invention, the storage compartment configuration has a flap pivotable around a second rotational axis. The storage compartment configuration is designed in such a manner that upon opening of the storage compartment, the flap moves around the second rotational axis opposite to the movement direction of the storage compartment.

The pivotable flap can preferably be paneled with the paneling material of the cabin or alternatively comprise the paneling material of the cabin. The flap can be fastened at one, preferably two or more points. On the one hand, the flap can be situated and/or fastened on the storage compartment. On the other hand, the flap can preferably be situated and/or fastened on the paneling of the aircraft cabin. In addition, the flap can be fastenable on the storage compartment. For example, in a closed position of the storage compartment, the flap can engage in a closing device on the outer side of the storage compartment, facing toward the cabin of the aircraft. In an open position of the storage compartment, the flap can be fastened or can automatically engage on the other side of the storage compartment, which is closer to the outer wall of the aircraft. Furthermore, the flap can be mounted pivotably or rotatably.

For example, a tilting and/or rotational or pivot movement of the storage compartment, having one open side toward the cabin, can correspond to the opening of the storage compartment. Upon opening of the storage compartment, the flap moves around the second rotational axis opposite to the movement direction of the storage compartment. "Opposite to the movement direction of the storage compartment" can be understood as follows here, for example: If one assumes that both the storage compartment and also the flap are located in the horizontal position in the closed state, the storage compartment moves clockwise around the geometric center point of the storage space upon opening, its opening moving downward and the flap also moving clockwise upward with the non-fastened side. Both the storage compartment and also the flap may thus move and/or rotate clockwise around the particular axis.

The movement path of the storage compartment can be significantly shortened by this movement of the flap, because only a part of the path must still be covered by the storage compartment until the storage space is completely accessible.

According to a further embodiment of the present invention, the storage compartment is connected to the flap by a lever system in such a manner that a movement of the storage compartment is transmitted to the flap and vice versa.

The lever system can be a configuration made of multiple levers, which may be connected to one another via joints, for example. In order to be able to achieve the greatest possible lever action, one of the fastening or engagement points of the lever may be a point which is located as far away from the flap as possible behind the suspension point of the storage compartment, out of sight of the flap. In this way, the swing of the storage compartment or the flap during opening may be exploited, so that no additional expenditure of force is needed to open the flap or the storage compartment, respectively. In addition, aesthetically appealing, flowing movements may be generated for passengers in this way.

According to a further embodiment of the present invention, the storage compartment is designed to move between a first position and a second position. The flap closes the access to the storage compartment in the first position and the storage compartment is inclined in relation to the horizontal in the first position in such a manner that the side of the storage compartment facing toward the flap is located above the geometric center point of the storage compartment. In the second position, the storage compartment is inclined in relation to the horizontal in such a manner that the side of the storage compartment facing toward the flap is located at the height of or below the geometric center point of the storage compartment.

The storage compartment can be capable of moving between a closed first position and an open second position. In the closed position, the flap closes the access to the opening of the storage compartment. Furthermore, the storage compartment is oriented and/or inclined in the closed position so that the side of the storage compartment facing toward the flap, i.e., the side having the opening through which a piece of luggage can reach the storage compartment, is located above the geometric center point of the storage compartment. This has the advantage that the piece of luggage slips downward, i.e., away from the opening of the storage compartment, under the effect of gravity and thus stabilizes the storage compartment in the closed position. In other words, in this way the danger can be reduced that, for example, in the event of possibly occurring turbulence, the storage compartment could open and the contained pieces of luggage could fall out again.

The storage compartment is similarly inclined in relation to the horizontal in the second position in such a manner that the side of the storage compartment facing toward the flap is located at the height of or below the geometric center point of the storage compartment. This makes the opening of the storage compartment more easily accessible to passengers.

According to a further embodiment of the present invention, the storage compartment configuration also has paneling. The paneling is situated on the storage compartment and the flap is designed as an extension of the paneling in the first position.

The paneling can be used to produce a visually appealing cabin form. The configuration of the paneling on the storage compartment can contribute to the visual integration of the storage compartment in the cabin.

If the storage compartment is located in the closed first position, the flap can possibly also be located in the closed first position thanks to the connection via the lever system. In this closed position, the flap can be designed as an extension of both the paneling on the storage compartment and also the surrounding cabin and preferably both. In other words, the flap can terminate flush with the paneling of the cabin on all sides and contribute to a visually appealing design of the cabin of the aircraft.

According to a further embodiment of the present invention, the flap is designed as an extension of an inner storage compartment wall in the second position.

The inner storage compartment wall can be the wall of a storage compartment which can adjoin the opening of the storage compartment and, in the case of a design of the storage compartment similar to a cuboid, can run parallel to the paneled wall of the storage compartment facing toward the cabin. In the open second position of the storage compartment, the flap can be used as an extension of the inner storage compartment wall. The flush termination of the flap with the inner storage compartment wall can be used for visual unity of the cabin and additionally can protect the space behind the paneling from access and dirtying.

According to a further embodiment of the present invention, the first rotational axis and the second rotational axis are situated parallel.

A harmonic mode of operation of the storage compartment configuration can be promoted by the parallel configuration of the first rotational axis of the suspension of the storage compartment, on the one hand, and the second rotational axis of the flap, on the other hand.

According to a second aspect of the present invention, an aircraft having a storage compartment configuration according to one of the preceding exemplary embodiments is described.

According to one embodiment of the present invention, the flap is designed to be situated so it is pivotable on cabin paneling. Therein, the flap is designed in the first position as an extension of the cabin paneling.

Further features and advantages of the present invention may be derived by one skilled in the art from the following description of exemplary embodiments, which are not to be understood as restricting the invention, however, with reference to the appended drawings.

Figure 1:
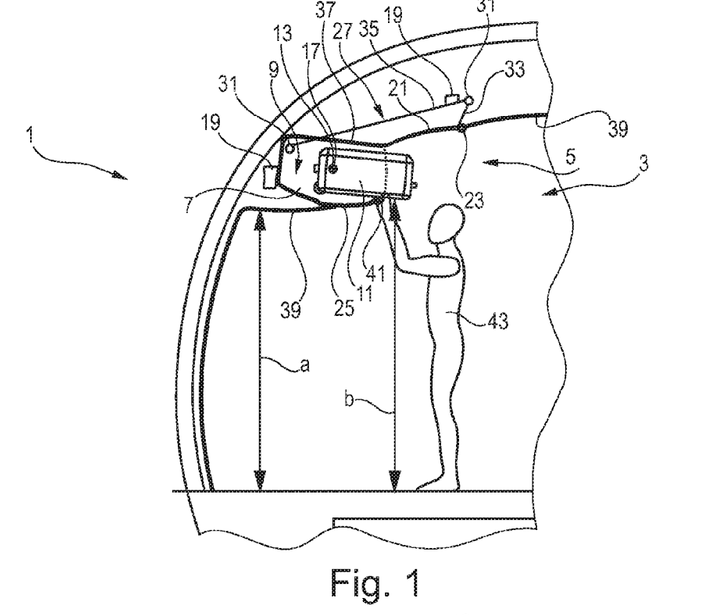
FIG. 1 shows a side view of a storage compartment configuration in an aircraft having a storage compartment in an open position.

All figures are only schematic illustrations of storage compartment configurations designed according to the invention in an aircraft and/or their components. In particular, distances and size relations are not shown to scale in the figures. Similar or identical elements are provided with the same reference numbers in the various figures A side view of a storage compartment configuration 5 in an aircraft 1 having a storage compartment 7 in an open position is shown in FIG. 1. A passenger 43 is located in the aircraft cabin 3, who is putting a piece of luggage 11 into the storage compartment device 5 or removing it. The storage compartment device 5 has a storage compartment 7 having a storage space 9 and a flap 21. The flap 21 is connected to the storage compartment 7 by a lever system 27, comprising multiple joints 31 and a first arm 33 and a second arm 35, in such a manner that the movement of the storage compartment 7 can be transmitted to the flap 21. Upon opening, both the storage compartment 7 and also the flap 21 rotate clockwise in the example shown. One of the joints 31 is situated directly on the storage compartment 7 in FIG. 1 and FIG. 2.

The storage compartment 7 is connected via the suspension 13 to a load-bearing structure of the aircraft 1. The suspension 13 is designed in such a manner that the storage compartment can be rotated around an imaginary first rotational axis 17, which goes through the suspension points. Furthermore, the suspension is selected and designed so that the first rotational axis 17 goes through the geometric center point 15 of the storage space 7. The geometric center point 15 of the storage space 7 is coincident with the first rotational axis 17 in the case of symmetrical design of the storage compartment 7 and homogeneous loading of the storage space 9. This is shown even more clearly in FIG. 3 through FIG. 5. A movement of the storage compartment 7 between the open and closed positions is possible for the passenger 43 nearly without expenditure of force due to the location of the center of gravity of the loaded storage compartment 7 being in the first rotational axis 17.

A handle 41 is situated on the flap 21, with the aid of which a passenger 43 can open and close the storage compartment configuration 5. The handle 41 can also contain a closing and catch device, to ensure the secure closing of the flap 21. Furthermore, the flap 21 has a second rotational axis 23, around which the flap 21 can be rotated. The lever system 27 engages on this second rotational axis 23 through the first arm 33 and transmits movements of the flap 21 to the storage compartment 7. The first rotational axis 17 of the storage compartment 7 and the second rotational axis 23 of the flap 21 are oriented parallel.

Directional elements 19 are situated on the storage compartment configuration 5. On the one hand, they may be designed in the form of a spring on the lever system 27, for example, and encourage the return of the storage compartment configuration 5 into the closed position. On the other hand, the directional elements 19 may be situated on the storage compartment 7 and encourage the displacement of the center of gravity into the first rotational axis 17 and/or into the geometric center point 15 of the storage compartment 7 by tilting or shifting the piece of luggage 11.

Figure 2:
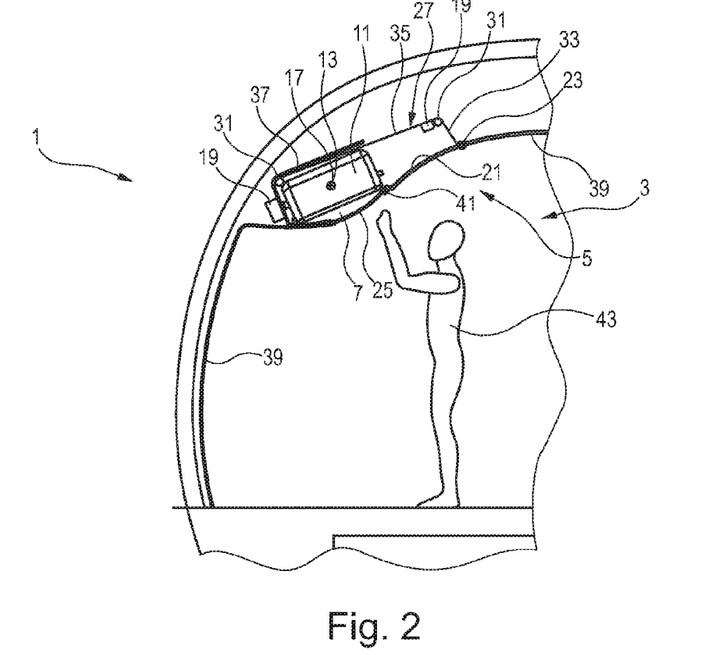
FIG. 2 shows a side view of a storage compartment configuration in an aircraft having a storage compartment in a closed position.

Furthermore, the storage compartment configuration 5 has paneling 25 on the lower, outer side of the storage compartment 7 facing toward the aircraft cabin 3. This paneling 25 is similar or identical to the cabin paneling 39. In the closed state of the storage compartment configuration 5, the flap 21 terminates flush with the cabin paneling 39 on one side and flush with the paneling 25 of the storage compartment 7 on the other side, as shown in FIG. 2, so that the flap 21 appears as an extension of the cabin paneling 39 and simultaneously of the paneling 25 of the storage compartment 7. A visually appealing smooth surface results in this way.

In the open state of the storage compartment configuration 5, as shown in FIG. 1, the flap 21 terminates flush with the inner storage compartment wall 37. A rounded visual appearance thus also results and the interior of the aircraft 1 is additionally protected from soiling.

The storage compartment configuration 5 is situated in the upper area of the aircraft cabin 3. In the open state, the storage compartment 7 is easy to reach by a passenger 43. Examples of orders of magnitude could be a cabin height a at the edge over the seats (which are not shown for better overview in the figures) of approximately 165 cm and a storage compartment height b with open storage compartment 7 of approximately 170 cm.

A side view similar to FIG. 1 of a storage compartment 5 in an aircraft 1 having a storage compartment 7 in a closed position is shown in FIG. 2. In contrast to FIG. 1, the lever system 27 is in a relaxed state in the closed state of the storage compartment configuration 5.

The storage compartment 7 is no longer nearly horizontal in the closed state, as shown in FIG. 1, but rather tilted somewhat to the side. This tilting allows space to be saved, because the storage compartment configuration 5 is located compactly on the side wall of the aircraft 1 and protrudes less into the aircraft cabin 3 than in the open state.

Figure 3:
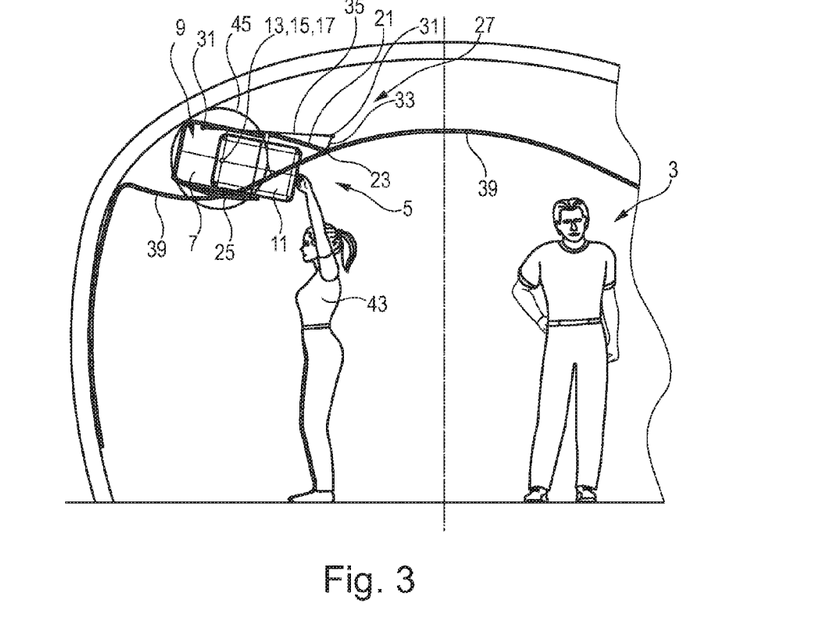
FIG. 3 shows a side view of a storage compartment configuration in an aircraft having a storage compartment in an open position according to a further exemplary embodiment of the present invention.
Figure 4:
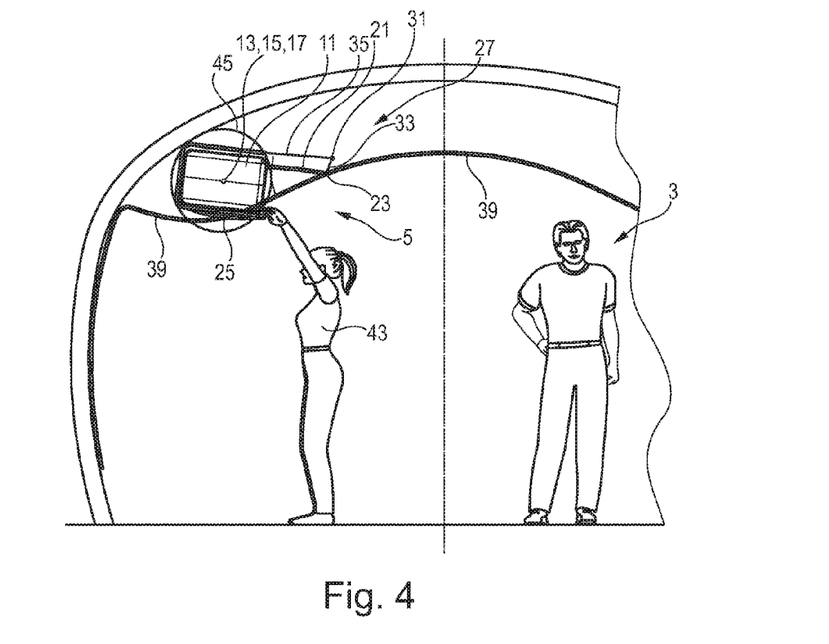
FIG. 4 shows a side view of a storage compartment configuration in an aircraft having a storage compartment in a middle position according to a further exemplary embodiment of the present invention.
Figure 5:
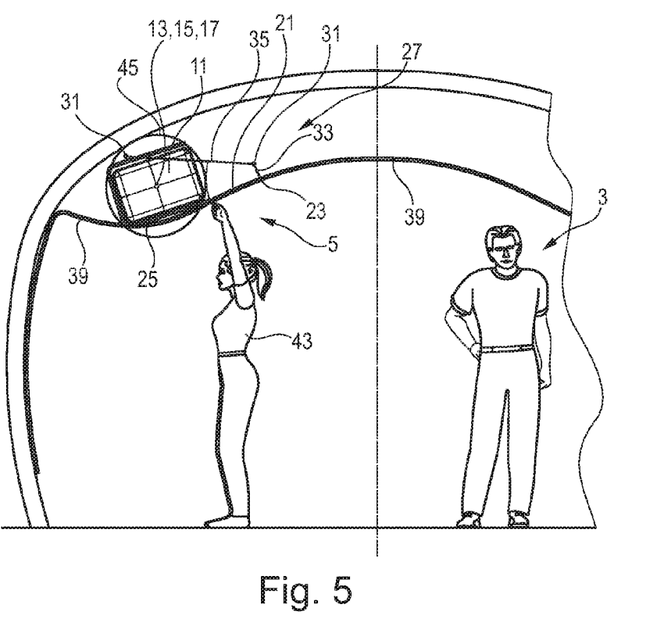
FIG. 5 shows a side view of a storage compartment configuration in an aircraft having a storage compartment in a closed position according to a further exemplary embodiment of the present invention.

A side view of the storage compartment configuration 5 in an aircraft 1 according to a further exemplary embodiment of the present invention is shown in FIG. 3 through FIG. 5. The storage compartment configuration 5 is shown in three different positions. FIG. 3 shows the storage compartment configuration 5 in an open position. FIG. 4 shows the storage compartment configuration 5 in a middle position between an open and a closed state of the storage compartment configuration 5, and FIG. 5 shows the storage compartment configuration 5 in a closed position.

In FIG. 3 through FIG. 5, the trajectory 45 of the storage compartment 7 is shown as a path which the edges of the storage compartment 7 cover during their movement. This trajectory 45 corresponds to a curved path and can correspond to a circle in the case of a complete rotation. In this exemplary embodiment, the storage compartment 7 is designed symmetrically in the form of a cuboid and as a rectangle in the side view and is homogeneously loaded, i.e., completely and without large cavities, using a piece of luggage 11. The geometric center point 15 of the storage space 9 and simultaneously of the storage compartment 7 is on the intersection of the diagonals of the cuboid or rectangle and is coincident with the suspension 13 and/or a first rotational axis 17 through the suspension 13. The center of gravity of the homogeneously loaded storage compartment is also on the first rotational axis 17 and simultaneously also in the geometric center point 15.

In contrast to FIG. 1 and FIG. 2, the paneling 25 on the storage compartment 7 is not shown as part of the storage compartment 7, but rather as a separate component which is situated on the storage compartment 7 in FIG. 3 through FIG. 5. Furthermore, in the exemplary embodiment in FIG. 3 through FIG. 5, both joints 31 are situated outside the storage compartment 7, as shown particularly clearly in FIG. 5.

Figure 6:
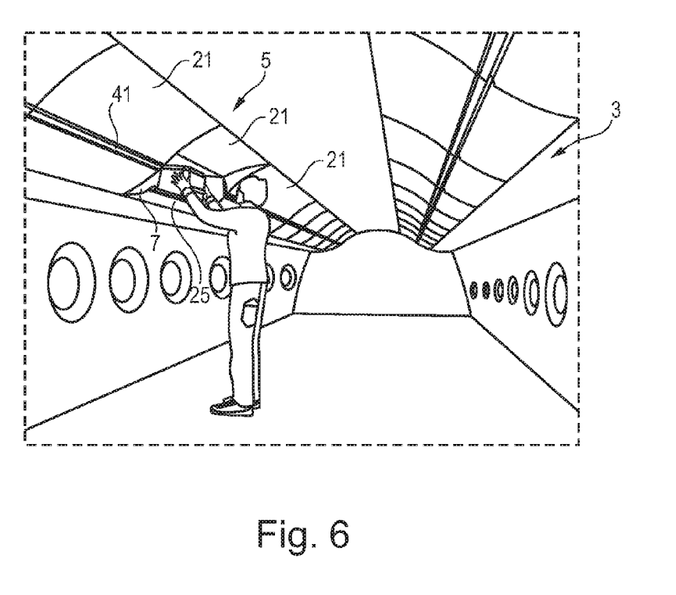
FIG. 6 shows a spatial perspective view of an aircraft cabin having a storage compartment configuration according to the invention having multiple storage compartments, one of which is in an open position.
Figure 7:
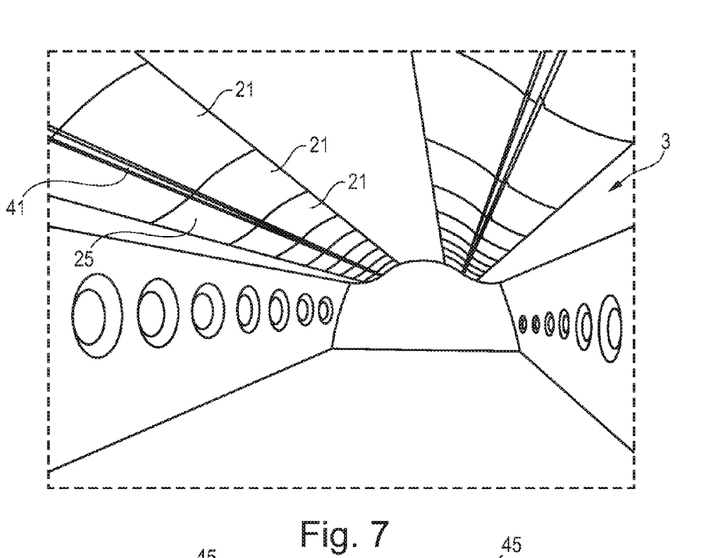
FIG. 7 shows a spatial perspective view of an aircraft cabin having a storage compartment configuration according to the invention having multiple storage compartments, all of which are in a closed position.

A spatial perspective view of an aircraft cabin 3 having a storage compartment configuration 5 according to the invention having multiple storage compartments 7 is shown in FIG. 6 and FIG. 7. In FIG. 6, one of the storage compartments 7 is located in an open position. In contrast, all storage compartments 7 are located in a closed position in FIG. 7.

It is clear in FIG. 6 that the storage compartment 7 moves downward upon opening starting from a closed state, while the flap 21 moves upward. All storage compartments 7 are in a closed position in FIG. 7, so that the aircraft cabin 3 provides a roomy impression.

Figure 8A:
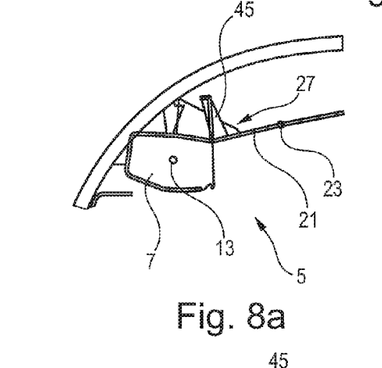
FIG. 8a shows a side view of a storage compartment configuration having a storage compartment in an open position according to a further exemplary embodiment of the present invention.
Figures 8B, 9B:
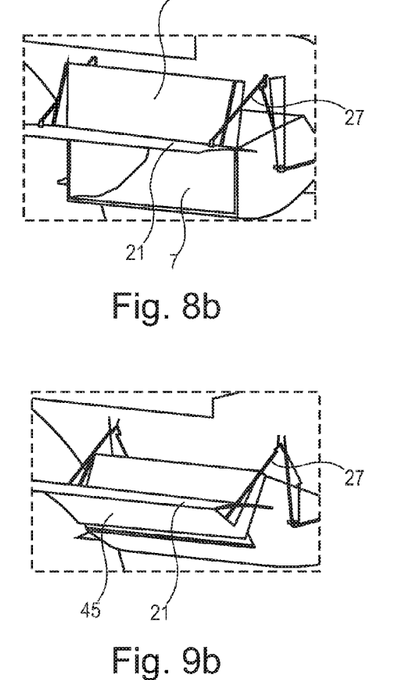
FIG. 8b shows a spatial perspective view of the storage compartment configuration shown in FIG. 8a having a storage compartment in an open position according to a further exemplary embodiment of the present invention.
FIG. 9b shows a spatial perspective view of the storage compartment configuration shown in FIG. 9a having a storage compartment in a closed position according to a further exemplary embodiment of the present invention.
Figure 9A:
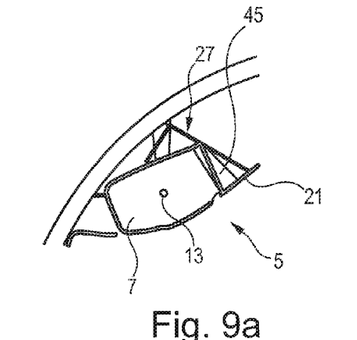
FIG. 9a shows a side view of a storage compartment configuration having a storage compartment in a closed position according to a further exemplary embodiment of the present invention.

A further exemplary embodiment of a storage compartment configuration 5 according to the invention having a storage compartment 7 is shown in FIG. 8 and FIG. 9. In FIG. 8a and FIG. 8b, the storage compartment 7 is an open position. The storage compartment 7 is shown in FIG. 8a in a side view and in FIG. 8b in a spatial perspective view. Similarly, FIG. 9a and FIG. 9b show the storage compartment 7 in a closed position, in FIG. 9a in a side view and in FIG. 9b in a spatial perspective view.

In contrast to the preceding exemplary embodiments, the storage compartment configuration 5 in FIG. 8 and FIG. 9 has a further closure element 45, which is situated on the flap 21. In the open state of the storage compartment configuration 5, the closure element 45 is located behind the flap 21 and is not visible from the aircraft cabin 3. In a closed state of the storage compartment configuration 5, the closure element 45 is located directly in front of an opening through which a piece of luggage 11 can reach the storage compartment 7. It can thus be ensured that the piece of luggage 11 remains in the storage compartment 7 and is not capable of slipping behind the cabin paneling 39 in the event of possible turbulence.

Furthermore, the lever system 27 is not situated on the second rotational axis 23 of the flap 21, but rather directly on the flap 21 in FIG. 8 and FIG. 9. The movement of the storage compartment 7 can be transmitted via the lever system 27 to both the flap 21 and also the closure element 45.

Finally, it is to be noted that expressions such as "comprising" or similar expressions are not to exclude further elements or steps being able to be provided. Furthermore, it is to be noted that "a" or "one" does not preclude a plurality. In addition, the features described in connection with the various embodiments may be combined with one another as desired. Furthermore, it is to be noted that the reference numerals in the claims are not to be understood as restricting the scope of the claims.

LIST OF REFERENCE NUMERALS 1 aircraft
3 aircraft cabin
5 storage compartment configuration
7 storage compartment
9 storage space
11 piece of luggage
13 suspension
15 geometric center point of the storage compartment
17 first rotational axis
19 directional elements
21 flap
23 second rotational axis
25 paneling
27 lever system
31 joint
33 first arm
35 second arm
37 inner storage compartment wall
39 cabin paneling
41 handle
43 passenger
45 trajectory of the storage compartment
47 closure element
a cabin height at the edge
b storage compartment height with open storage compartment

The invention claimed is:

1. A storage compartment configuration for an aircraft, the storage compartment configuration comprising:
    a storage compartment having a storage space for receiving pieces of luggage;
    a suspension for attaching the storage compartment to a load-bearing structure of the aircraft;
    wherein the suspension is pivotably connected at a geometric center point of the storage compartment such that, in pivoting, a pivot axis of the storage compartment moves along a curved path;
    wherein the suspension is further configured such that a center of gravity of a homogeneously loaded storage compartment is along the pivot axis; and
    wherein the pivoting comprises a translational and rotational movement.

2. The storage compartment configuration according to claim 1, wherein the suspension is configured along a second rotational axis.

3. The storage compartment configuration according to claim 1, further comprising a plurality of directional elements;
    wherein the plurality of directional elements is configured to encourage a displacement of a center of gravity of the homogeneously loaded storage compartment into the geometric center point.

4. The storage compartment configuration according to claim 2
    wherein the storage compartment is configured such that, upon opening of the storage compartment, the flap moves around the first rotational axis in a direction opposite to a movement of the storage compartment.

5. The storage compartment configuration according to claim 4, further comprising a lever system, wherein the storage compartment is connected by the lever system to the flap in such a manner that a movement of the storage compartment is transmitted to the flap and vice versa.

6. The storage compartment configuration according to claim 4,
    wherein the storage compartment is configured to move between a first position and a second position;
    wherein the flap is configured to move between A first position and a second position;
    wherein the storage compartment is inclined in relation to the horizontal in the first position in such a manner that a side of the storage compartment facing toward the flap is located above the geometric center point of the storage compartment; and
    wherein the storage compartment is inclined in relation to the horizontal in the second position in such a manner that a side of the storage compartment facing toward the flap is located at the height of or below the geometric center point of the storage compartment.

7. The storage compartment configuration according to claim 6, further comprising a paneling;
    wherein the paneling is situated on the storage compartment; and
    the flap is designed in the first position as an extension of the paneling.

8. The storage compartment configuration according to claim 6, wherein the flap is configured in the second position as an extension of an inner storage compartment wall.

9. The storage compartment configuration according to claim 4, wherein the first rotational axis and the second rotational axis are oriented parallel to each other.

10. An aircraft having a storage compartment configuration, the storage compartment configuration comprising:
    a storage compartment having a storage space for receiving pieces of luggage;
    a suspension for attaching the storage compartment to a load-bearing structure of the aircraft;
    wherein the suspension is pivotably connected at a geometric center point of the storage compartment such that, in pivoting, a pivot axis of the storage compartment moves along a curved path;
    wherein the suspension is further configured such that a center of gravity of a homogeneously loaded storage space is in along the pivot axis; and
    wherein the pivoting comprises a translational and rotational movement.

11. The aircraft according to claim 10, further comprising a cabin paneling,
    wherein the flap is pivotable on the cabin paneling; and
    wherein the flap is configured in a first position as an extension of the cabin paneling.

12. The storage compartment of claim 1, wherein the suspension is further configured such that a pivot axis of the storage compartment deviates from the geometric center point by up to 20 cm.

13. The storage compartment of claim 1, further comprising a plurality of directional elements;
   wherein the plurality of directional elements is configured to shift the center of gravity of a non-homogeneously loaded storage compartment into the geometric center point.

* * * * *

UNITED STATES PATENT AND TRADEMARK OFFICE
CERTIFICATE OF CORRECTION

| | | Page 1 of 1 |
|---|---|---|
| PATENT NO. | : 8,919,695 B2 | |
| APPLICATION NO. | : 12/747237 | |
| DATED | : December 30, 2014 | |
| INVENTOR(S) | : Thomas Bock et al. | |

It is certified that error appears in the above-identified patent and that said Letters Patent is hereby corrected as shown below:

In the claims;

Column 10, line 23 claim 6 "move between A first position and a second position;" should read --close the access to the storage compartment in the first position--;

Column 10, line 39 claim 7 "designed" should read --configured--.

Signed and Sealed this
Twenty-fourth Day of May, 2016

Michelle K. Lee
*Director of the United States Patent and Trademark Office*